S. I. STOKES AND T. J. WYATT.
GASOLENE FEED.
APPLICATION FILED JAN. 17, 1919.
1,341,393.  
Patented May 25, 1920.
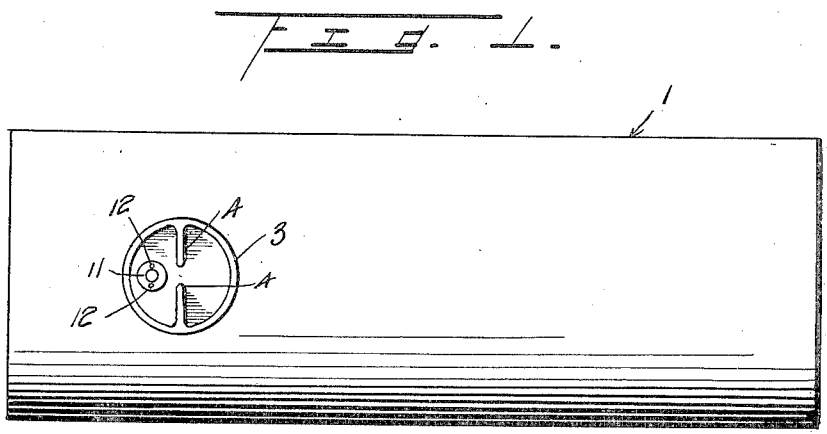
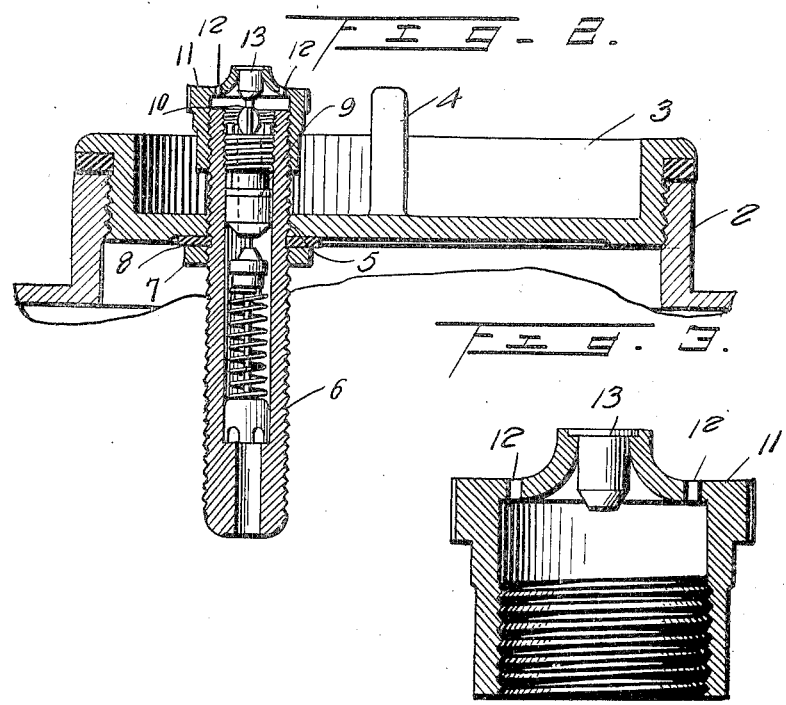
Inventors.  
S. I. Stokes.  
T. J. Wyatt.
By  Attorney.

UNITED STATES PATENT OFFICE.

SAMUEL I. STOKES AND THOMAS J. WYATT, OF CASPER, WYOMING.

GASOLENE-FEED.

1,341,393. Specification of Letters Patent. Patented May 25, 1920.

Application filed January 17, 1919. Serial No. 271,723.

*To all whom it may concern:*

Be it known that we, SAMUEL I. STOKES and THOMAS J. WYATT, citizens of the United States, residing at Casper, in the county of Natrona and State of Wyoming, have invented certain new and useful Improvements in Gasolene-Feeds; and we do hereby declare the following to be a full, clear, and exact description of the invention, such as will enable others skilled in the art to which it appertains to make and use the same.

This invention relates to improvements in gasolene feeds for internal combustion engines of automobiles and has for one of its objects the provision of a device of this character whereby gasolene or the fuel from the supply tank of gravity type can be placed under pneumatic pressure when desired or when the gasolene or fuel becomes low and the automobile at the same time is traveling up hill, thus obviating the annoyances caused by automobiles employing the gravity feed being unable to travel up steep hills when the gasolene or fuel becomes low in the tank.

Another object of this invention is the provision of means for permitting the fuel or gasolene to be again fed by gravity after once being under pneumatic pressure and which also places the gasolene or fuel under atmospheric pressure so that the same will readily run out of the tank.

A further object of this invention is the provision of a gasolene feed of the above stated character, which will be simple, durable and efficient, and which may be manufactured and sold at a comparatively low cost.

With these and other objects in view as will become more apparent as the description proceeds, the invention consists in such novel features of construction, combination and arrangement of parts as will be hereinafter more fully described, and claimed.

For a complete understanding of our invention, reference is to be had to the following description and accompanying drawings, in which:

Figure 1 is a plan view of a gasolene tank illustrating our invention applied thereto, Fig. 2 is a vertical sectional view of the cap and controlling valve of the tank and which is constructed in accordance with our invention, Fig. 3 is a detail view of the closure cap for the valve.

Referring in detail to the drawings, the numeral 1 indicates the gasolene or fuel tank of an automobile and which is usually located upon the automobile at a point above the carbureter of the engine so that the fuel can pass from the tank into the carbureter by gravity. The tank 1 is provided with the usual filling spout 2 which is internally screw threaded to receive a cap 3. The cap 3 is provided with finger grips 4 so that the same can be readily threaded into the filling spout 2. The cap 3 is provided with an opening 5 adapted to receive a valve housing 6. The valve housing 6 is internally screw threaded and also externally screw threaded and is held in tight engagement with the wall of the opening by means of a nut 7 threaded upon the exterior of the housing and forcing the washer 8 against the inner face of the cap 3 so as to provide a leak-proof connection between the valve housing or casing and the cap 3. The valve housing or casing has located therein a valve 9 which valve and also the valve casing or housing is of a well known type and which is usually employed on pneumatic tires for the purpose of permitting air to enter the tire but will prevent the escape of air from said tire unless the valve 9 is pushed downwardly by placing an instrument in engagement with the stem 10. The upper end of the stem 10 is disposed in a plane slightly above the upper end of the valve housing or casing 6. The valve casing or housing 6 projects beyond the upper face of the cap 3 so that a pneumatic pump of any desired construction can be readily connected to the same.

In operation, when the automobile is traveling upon a steep grade or hill, and the fuel or gasolene within the tank 1 becomes low so that the same will not feed into the carbureter by gravity, a hand pump frequently used for inflating tires may be attached to the valve housing or casing 6 and air forced into the tank 1 to approximately about one pound pressure which will cause the gasolene or fuel in the tank to pass from the same into the carbureter thus insuring the engine of the provision of fuel when traveling upon a hill or steep grade.

When automobiles employ the gravity type feed, it is necessary that the fuel within the tank 1 under ordinary conditions be placed under atmospheric pressure and to provide means for this, the cap 11 is adapted to be threaded onto the upper end of the valve casing or housing and is provided with spaced openings 12 in the top wall and a central projection 13 adapted to engage the upper end of the stem 10 and thus tend to unseat the valve 9 as the cap is threaded downwardly upon the valve housing or casing, permitting the air pressure within the tank 1 to escape and also leaving the tank open to atmospheric pressure through the openings of the closure cap 11 and the unseated valve 9.

It is also to be noted that this device can be employed for cleaning out or blowing out the gasolene line from the carbureter to the tank of an automobile when desired by simply draining the fuel or gasolene that may be in the tank out and opening the usual drain trap of the carbureter and placing a pneumatic pump upon the valve casing or housing and forcing air into the tank which will remove any particles of foreign matter that may have accumulated within the feed pipe from the carbureter to the tank.

Having thus described our invention what we claim is:

A device of the character set forth including a closure member, a valve housing secured to the member, an inwardly opening valve in said housing, a cap detachably and adjustably secured to the casing and having openings in the top thereof, and an inwardly directed projection formed on said cap for unseating the valve by adjusting the cap of the housing.

In testimony whereof we affix our signatures in presence of two witnesses.

SAMUEL I. STOKES.
THOMAS J. WYATT.

Witnesses:
  Mrs. MURL HAWKS,
  SAN PANER.